United States Patent
Karanam

(10) Patent No.: US 12,156,045 B2
(45) Date of Patent: *Nov. 26, 2024

(54) USER CALL QUALITY IMPROVEMENT

(71) Applicant: T-Mobile USA, Inc., Bellevue, WA (US)

(72) Inventor: Hemanth Karanam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 390 days.

This patent is subject to a terminal disclaimer.

(21) Appl. No.: 17/523,685

(22) Filed: Nov. 10, 2021

(65) Prior Publication Data

US 2022/0070695 A1 Mar. 3, 2022

Related U.S. Application Data

(63) Continuation of application No. 16/034,319, filed on Jul. 12, 2018, now Pat. No. 11,202,212.

(51) Int. Cl.
*H04W 24/02* (2009.01)
*G10L 21/0364* (2013.01)
(Continued)

(52) U.S. Cl.
CPC ......... *H04W 24/02* (2013.01); *G10L 21/0364* (2013.01); *G10L 25/60* (2013.01);
(Continued)

(58) Field of Classification Search
None
See application file for complete search history.

(56) References Cited

U.S. PATENT DOCUMENTS 11,202,212 B2 * 12/2021 Karanam ............ H04M 3/2236
2004/0071084 A1 * 4/2004 El-Hennawey ....... H04W 24/06
370/235

(Continued)

FOREIGN PATENT DOCUMENTS

KR  20020058327 A  7/2002

OTHER PUBLICATIONS

International Searching Authority, International Search Report and Written Opinion, PCT Patent Application PCT/US2019/041600, mailed May 6, 2020, 12 pages.

*Primary Examiner* — Christopher T Wyllie
(74) *Attorney, Agent, or Firm* — Perkins Coie LLP

(57) ABSTRACT

The disclosed system provides a facility for improving user call quality at a mobile device. The system includes an over-the-top (OTT) client that may be installed on the mobile device for allowing a user to initiate call quality tests. The system performs a call quality test to generate a call quality score or metric from the obtained audio sample via a Call Quality Algorithm. If the call quality score or metric falls below a predetermined threshold, the system may suggest (via the OTT client or via a push notification) that the user of the mobile device switch from the first communication interface (e.g., a radio network such as 4G) to a second communication interface (e.g., Wi-Fi) on the mobile device. The disclosed system tracks the call quality score or metric of multiple mobile devices operating within a telecommunications network, identifies service outages within the network, and notifies impacted mobile devices.

20 Claims, 4 Drawing Sheets

(51) Int. Cl.
  *G10L 25/60* (2013.01)
  *H04L 67/55* (2022.01)
  *H04W 24/08* (2009.01)
  *H04W 36/14* (2009.01)
  *H04W 84/12* (2009.01)

(52) U.S. Cl.
  CPC ............. *H04L 67/55* (2022.05); *H04W 24/08* (2013.01); *H04W 36/1446* (2023.05); *H04W 84/12* (2013.01)

(56) References Cited

U.S. PATENT DOCUMENTS

| | | | |
|---|---|---|---|
| 2009/0163142 A1 | 6/2009 | Pi et al. | |
| 2010/0091668 A1 | 4/2010 | Sugahara et al. | |
| 2013/0303155 A1* | 11/2013 | Da Silva | H04W 24/02 455/423 |
| 2015/0124781 A1* | 5/2015 | Surface | H04M 7/0084 370/332 |
| 2016/0028881 A1* | 1/2016 | Assem | H04L 47/196 370/252 |
| 2016/0373944 A1* | 12/2016 | Jain | H04M 3/2236 |
| 2016/0381660 A1* | 12/2016 | Mittal | H04M 1/724 455/421 |
| 2017/0289885 A1* | 10/2017 | Kaushik | H04W 36/18 |
| 2017/0325242 A1* | 11/2017 | Reijonen | H04W 72/542 |
| 2017/0374594 A1 | 12/2017 | Khawam et al. | |
| 2018/0006957 A1* | 1/2018 | Ouyang | H04L 43/091 |
| 2018/0091202 A1 | 3/2018 | Azogui et al. | |
| 2020/0022002 A1* | 1/2020 | Karanam | H04M 3/2236 |
| 2022/0070695 A1* | 3/2022 | Karanam | G10L 25/60 |

\* cited by examiner

US 12,156,045 B2

USER CALL QUALITY IMPROVEMENT

CROSS-REFERENCE TO RELATED APPLICATIONS

This application is a continuation of U.S. patent application Ser. No. 16/034,319, filed Jul. 12, 2018, entitled USER CALL QUALITY IMPROVEMENT, which is hereby incorporated by reference in its entirety.

BACKGROUND

In modern wireless telecommunications systems, mobile devices are capable of carrying telephone calls via multiple communication interfaces, such as radio network interfaces (3G, 4G, etc.) and Wi-Fi. At any given time in a geographical area, the telecommunications network may be experiencing a service outage with respect to one type of interface while a different type of interface may be operating at optimal efficiency with no outage or performance issues. For example, a radio network may experience problems when a weak signal exists at a specific location, or when an issue exists at one or more radio network elements. As another example, a Wi-Fi network may experience problems when a weak Wi-Fi signal exists at a particular location due to a router issue, or when an issue exists at one or more Wi-Fi network elements. When a service outage occurs, mobile device users who are connected to the interface experiencing an outage may suffer from a poor-quality connection, leading to frustration and overall dissatisfaction for the impacted mobile device users. In many instances, this frustration and dissatisfaction could be avoided by switching the mobile device user from an impacted interface to a different interface that is working properly in the mobile device user's geographic area. However, oftentimes an impacted user is unaware that a better option is available. Therefore, a need exists to determine, e.g., when a service outage has occurred with respect to a first interface and proactively suggest a second interface that a mobile device user can switch to in order to receive optimal service. These and other issues exist with wireless networks.

DETAILED DESCRIPTION

Figure 1:
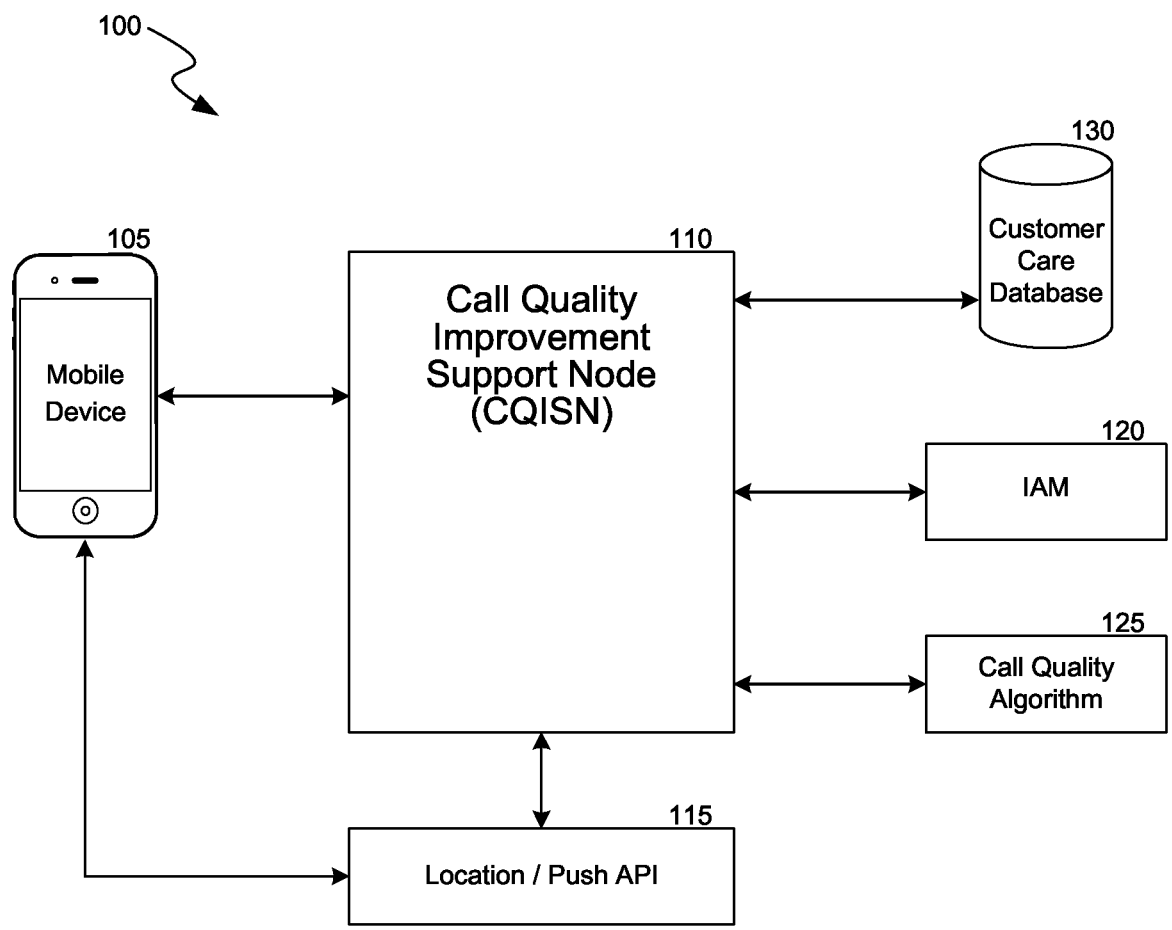
FIG. 1 is a diagram of a representative environment in which the disclosed system to provide user call quality improvement may operate.

A system and method for improving user call quality at a mobile device is disclosed. The system includes an over-the-top (OTT) client that may be installed on the mobile device. The OTT client may allow the user to initiate a call quality test, view results of the call quality test, view one or more suggested actions corresponding to the results of the call quality test (e.g., switching from a first communication interface on the mobile device to a second communication interface on the mobile device), and/or execute the suggested action. In some embodiments, the system may send one or more notifications of call quality test results and/or one or more suggested actions to the mobile device via push notifications sent via a push notification server.

The disclosed system performs call quality tests by obtaining a voice sample from the mobile device, either from a real-time conversation placed from a first communication interface of the mobile device to a call recipient selected by a user of the mobile device, or from a call placed from the first communication interface of the mobile device to a predetermined phone number using a previously stored audio sample. The system generates a call quality score or metric from the obtained audio sample using a Call Quality Algorithm as described in more detail herein. If the call quality score or metric falls below a predetermined threshold, the system may suggest (via the OTT client or via a push notification) that the user of the mobile device switch from the first communication interface (e.g., a radio network such as 4G) to a second communication interface (e.g., Wi-Fi) on the mobile device. In some embodiments, a switch may occur while a real-time call is in progress such that handover from the first communication interface to the second communication interface is completed without interruption to the call.

In some embodiments, the system tracks the call quality score or metric of multiple mobile devices operating within a telecommunications network. Using the tracked call quality scores or metrics, the system may monitor the telecommunications network to identify service outages in particular geographical areas within the network. A service outage may occur when the service available via the telecommunications radio network, Wi-Fi network, or other telecommunications network is severely impacted, such as when a connection between a mobile device and the telecommunications network is slow, non-existent, or otherwise operating at a suboptimal level. Once such network outages are identified, the system may proactively transmit notifications to mobile devices within a geographical area that is impacted by the outage. For example, if the system detects a Wi-Fi outage within a geographical area, the system may transmit a notification to the impacted mobile devices via a radio network such as 4G or 5G. In some embodiments, transmitted notifications may include information such as a reason for the outage, specific details on the geographical area or areas impacted, and/or an estimated time for restoring the outage.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a diagram of a representative environment 100 in which the disclosed system to provide user call quality improvement may operate. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Representative environment 100 includes Call Quality Improvement Support Node (CQISN) 110, which is adapted to communicate with mobile device 105 and Location/Push Application Program Interface (API) 115. Although depicted as a single API, in other embodiments Location services and Push services may be provided via two or more separate APIs. As described in more detail herein, a user of mobile device 105 may initiate a test to determine the call quality available on a communication interface of the mobile device. To perform the test, CQISN 110 may use an Identity Access Module 120 to authenticate the mobile device user, and CQISN 110 may use Location/Push API 115 to determine a location of mobile device 105. Using the determined location of the mobile device, CQISN 110 may query Customer Care Database 130 to determine whether a service outage exists in the geographical area in which mobile device 105 is located, as described in further detail herein. CQISN 110 may obtain an audio sample from a phone call initiated from mobile device 105. The obtained audio sample may correspond to a real-time telephone call placed from mobile device 105 to a phone number or contact selected by the user of the mobile device, or may correspond to a sample telephone call placed from the mobile device to a predetermined phone number. In the case of a sample telephone call, the system may play a previously stored audio sample during the telephone call such that the mobile device user is not required to actively participate in the telephone call. After obtaining the audio sample, CQISN 110 may use Call Quality Algorithm 125 to determine a quality score or metric that corresponds to the quality available on a selected interface (e.g., a Wi-Fi connection or a radio connection) of mobile device 105. If the determined quality score or metric is below a predetermined threshold, CQISN 110 may suggest that the user of the mobile device switch from a first communication interface to a second communication interface. CQISN 110 may communicate information to mobile device 105, such as service outage status, call quality scores or metrics, and/or suggested actions to be taken on the mobile device. CQISN 110 may communicate such information by either transmitting the information to an OTT application that is installed on the mobile device or by transmitting a push notification to the mobile deice via Location/Push API 115. Although not shown, in some embodiments the system may query a Telephony Application Server (TAS) to obtain one or more Call Detail Records (CDRs) and determine call quality by analyzing information contained in the obtained CDRs.

Figure 2:
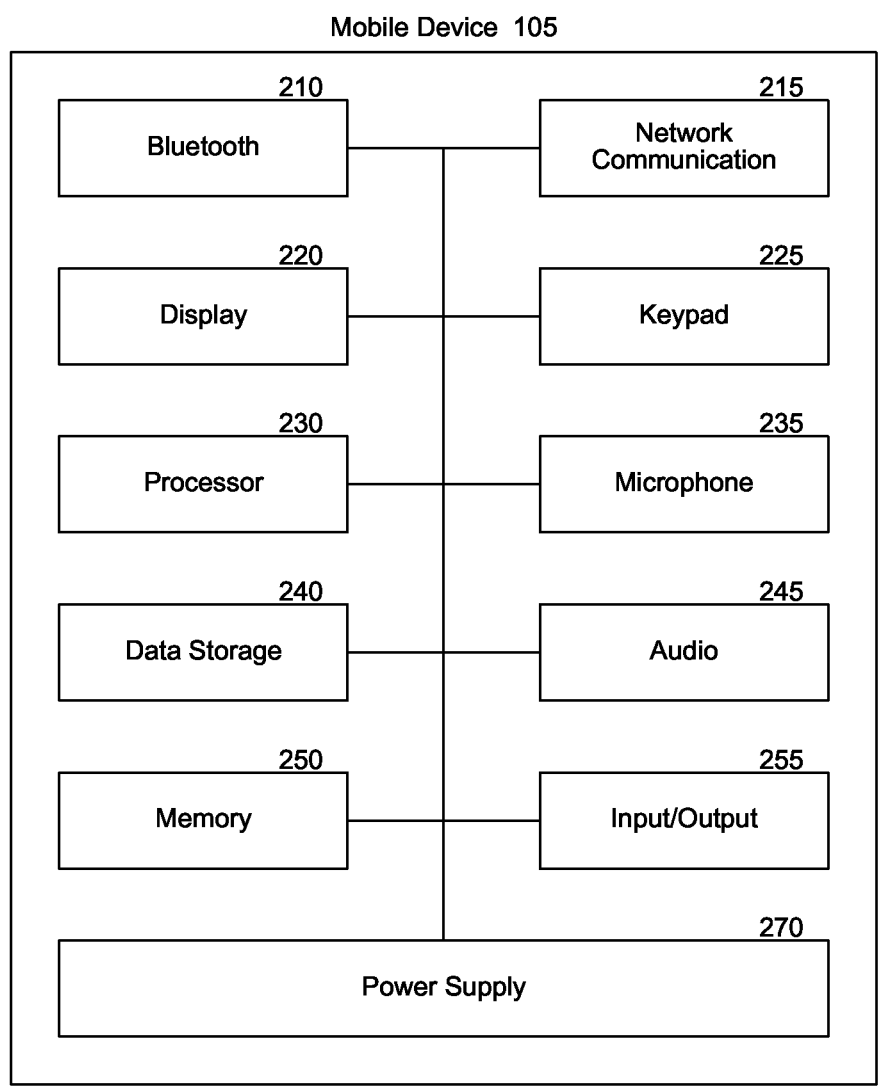
FIG. 2 is a representative block diagram of mobile device 105 in accordance with embodiments herein.

FIG. 2 is a representative block diagram 200 of mobile device 105 in accordance with embodiments herein. Mobile device 105 typically includes a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth interface 210; and network communication interface 215, which enables the mobile phone to communicate by transmitting and receiving wireless signals using licensed, semi-licensed or unlicensed spectrum over a telecommunications network), an audio interface 245, a display 220, a keypad or keyboard 225, a microphone 235, and other input and/or output interfaces 255. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more Session Initiation Protocol (SIP) or Diameter protocol clients capable of generating, transmitting and interpreting syntactically correct SIP or Diameter protocol messages. SIP clients permit the mobile device to register with and communicate via networks such as Internet Protocol Multimedia Subsystem (IMS) networks.

Mobile device 105 may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile device 105 may connect to a telecommunications network via a trusted radio access network (RAN) or an untrusted RAN. A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("Wi-Fi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Figure 3:
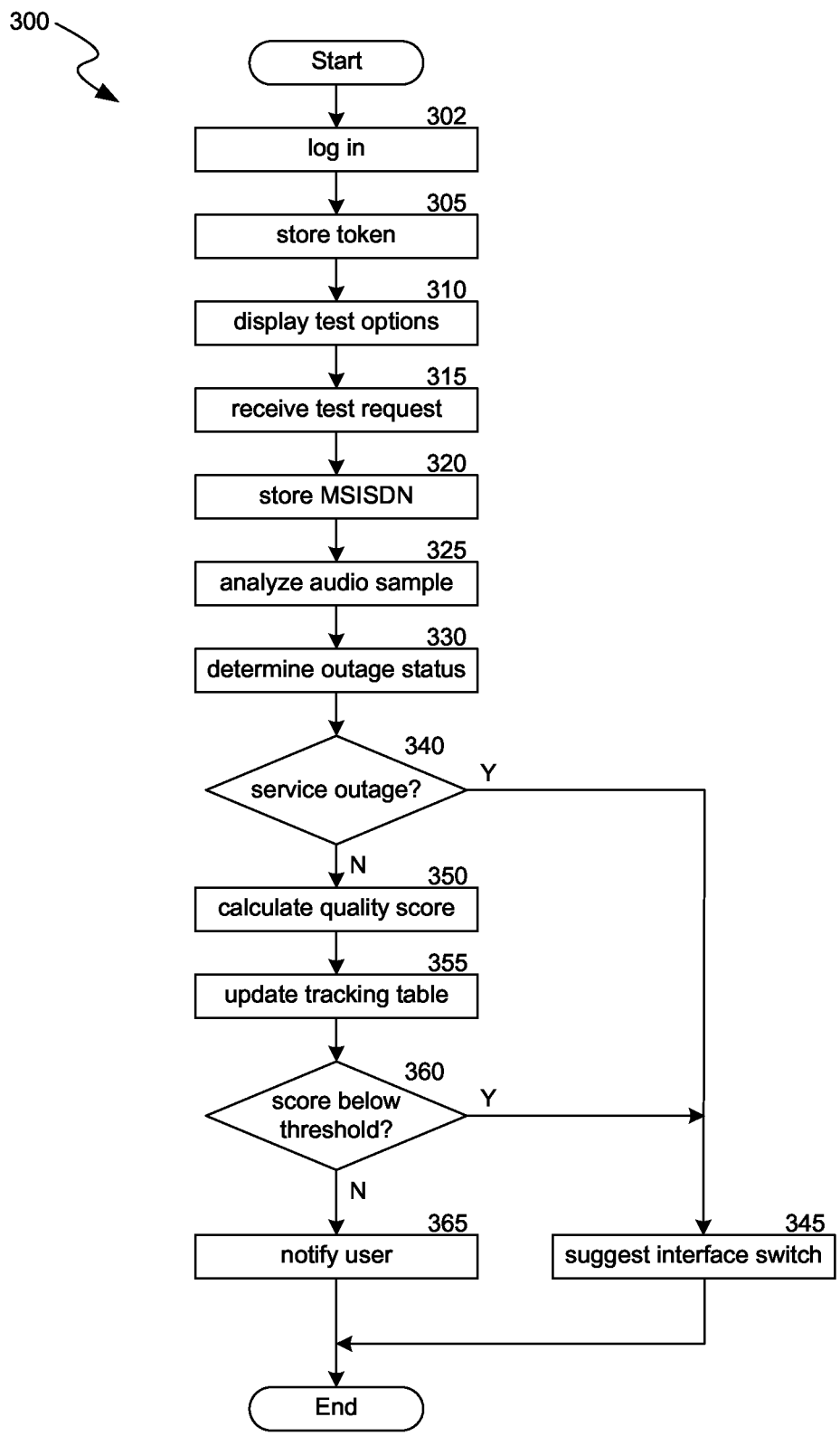
FIG. 3 is a flowchart 300 showing a procedure for improving user call quality in accordance with embodiments disclosed herein.

FIG. 3 is a flowchart 300 showing a procedure for improving user call quality in accordance with embodiments disclosed herein. At block 302, a mobile device user logs into Call Quality Improvement Support Node (CQISN) 110. In some embodiments, the user may download and install an OTT client in order to complete the login process. In other embodiments, the user may log in to CQISN 110 via software or applications that are preinstalled on the mobile device either by the Original Equipment Manufacturer (OEM) or the telecommunications service provider. The login procedure may be completed when the user provides credentials such as an email address and/or telephone number, and a password. Alternatively or additionally, the user may provide authentication by inputting a gesture on the mobile device or by providing biometric information, such as a fingerprint, retina scan, or facial scan of the user. At block 305, a push token from mobile device 105 is stored in CQISN 110. The push token enables the disclosed system to send push notifications to the mobile device. For example, for mobile devices operating on the iOS platform (such as those manufactured by APPLE INCORPORATED), the stored push token enables the disclosed system to send push notifications to the mobile device via Apple Push Notification Server (APNS). As another example, for mobile devices operating on the ANDROID platform (such as those manufactured by GOOGLE LLC or SAMSUNG ELECTRONICS CO., LTD.) the stored push token enables the disclosed system to send push notifications to the mobile device via Firebase Cloud Messaging (FCM).

Figure 4:
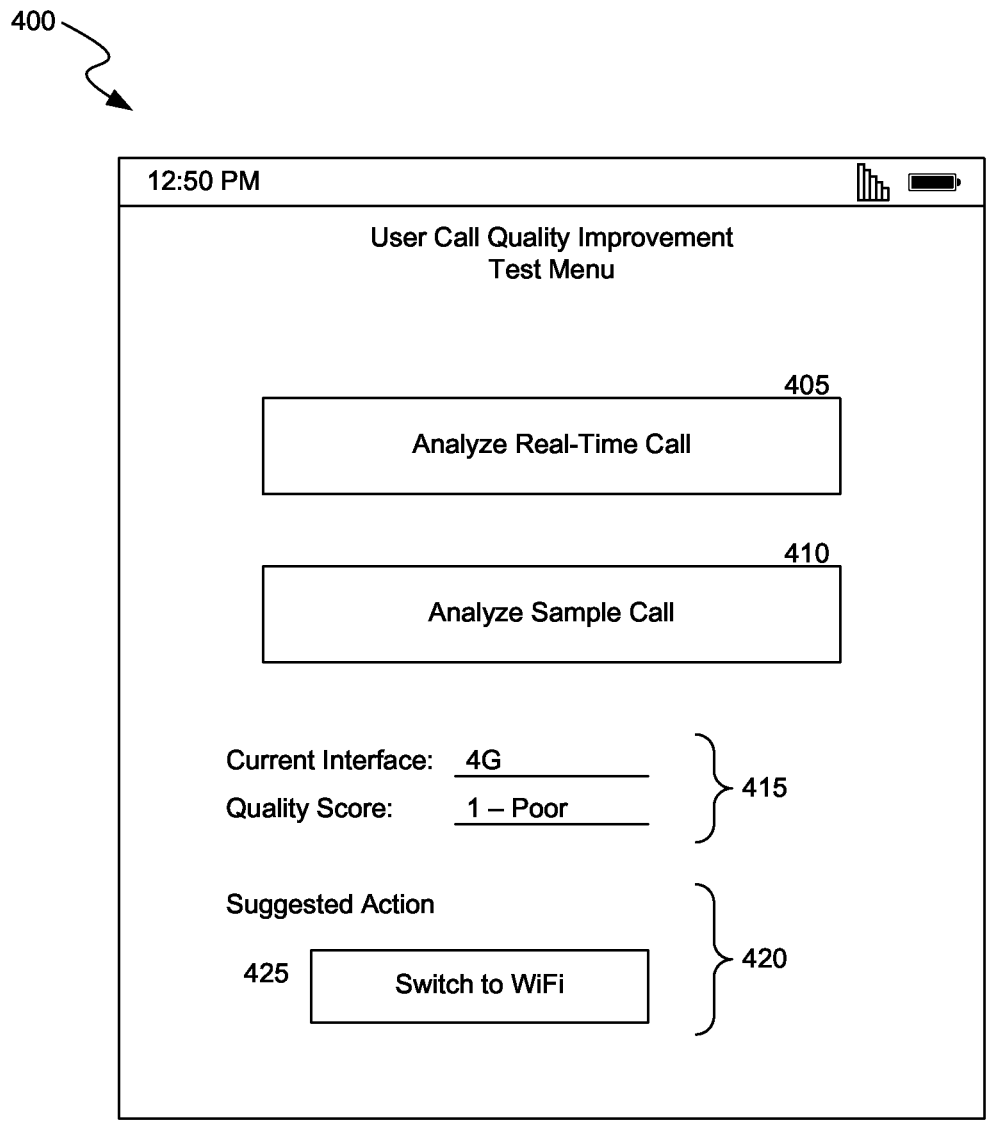
FIG. 4 illustrates an embodiment of a test menu interface for initiating a call quality test and viewing test results in accordance with embodiments herein.

After successful user login, the system proceeds to block 310 and displays on a screen of the mobile device options for the mobile device user to initiate a call quality test. FIG. 4 illustrates an embodiment of a test menu interface 400 for initiating a call quality test and viewing test results in accordance with embodiments herein. Test menu interface 400 includes a button 405 that a user may select to test the quality of a real-time phone call that the user initiates. In some embodiments, when a user clicks button 405, the system displays a separate screen (not shown) to allow the user to dial a telephone number or select a telephone number to dial from a stored contact. Test menu interface 400 also includes a button 410 that the user may select to test the quality of a phone call placed to a predetermined telephone number that is specified by a telecommunication service provider or an OEM. Test menu interface 400 includes test results area 415 for displaying an identification of the communication interface that is to be tested (e.g., 4G or Wi-Fi) and the results of the call quality test (e.g., a raw test score, a quality indicator, or a pass/fail indication). In some embodiments, the disclosed system tests the currently active communication interface by default. In other embodiments, the disclosed system allows a user of the mobile device to select which interface (or multiple interfaces) to test. Test menu interface 400 includes a suggested action area 420 for displaying a recommendation to the user, such as a recommendation for the user to remain on the current interface or to switch to a different interface. In some embodiments, suggested action area 420 may include a button 425 to execute the suggested action. For example, if the disclosed system recommends that the user switch from a 4G connection to a Wi-Fi connection based on the results of the call quality test, then test menu interface 400 may display button 425 ("Switch to Wi-Fi") to switch from the 4G connection to the Wi-Fi connection upon selection by a user. In some embodiments, rather than displaying an option such as button 425, the system may automatically take the recommended action without displaying an option to the user or awaiting user input.

Returning to FIG. 3, at block 315, the system receives a request from a user's mobile device to analyze call quality on an interface of the mobile device. The received request may specify that the test is to be performed on a real-time call to a telephone number selected by the user, or the request may specify that the test is to be performed on a sample call to a predetermined telephone number as described herein. At block 320, the system stores in CQISN 110 a unique identifier associated with the user's mobile device, such as a Mobile Station International Subscriber Directory Number (MSISDN). At block 325, the system obtains an audio sample and tests the obtained audio sample to determine call quality. If the received request specifies that the test is to be performed on a real-time call, then the system allows a user of the mobile device to manually place a telephone call to a call recipient, and the system obtains an audio sample from the telephone call for subsequent analysis. If the received request specifies that the test is to be performed on a sample call, then the system places a call to a predetermined telephone number (e.g., a phone number specified by the OEM or telecommunications service provider), plays a prerecorded audio file from the mobile device while the sample call is in progress, and obtains an audio sample from the sample telephone call. The audio sample from the sample telephone call is subsequently analyzed to determine call quality, as described in more detail herein.

At block 330, the system determines whether a service outage exists in the geographical area where the mobile device is located. In some embodiments, the system determines the geographical location of the mobile device by querying CDRs associated with the mobile device from a TAS. In other embodiments, the system obtains the geographical location of the mobile device by invoking a location services Application Program Interface (API) installed on the mobile device. The determined location of the mobile device may be a Zone Improvement Program (ZIP) code, a street address, a set of Global Positioning System (GPS) coordinates, or any identifier or set of identifiers sufficient to indicate a geographical region in which the mobile device is located. After the system obtains a geographical location of the mobile device, the system determines whether any known service outages exist in the geographical area in which the mobile device is located. For example, the system may maintain and query a tracking table that may reside on a Customer Care Database 130. The tracking table may include multiple entries, each containing an identifier corresponding to a mobile device (e.g., a MSISDN, International Mobile Equipment Identity (IMEI), or International Mobile Subscriber Identity (IMSI)), a timestamp, an indication of whether one or more communication interfaces of the mobile device are online or offline, and an indication of a location of the mobile device. Upon analyzing the tracking table, the system may flag one or more geographical areas as having an outage condition with respect to a particular type of communication interface if a threshold number of mobile devices (or a threshold percentage of mobile devices) in the geographical area are offline with respect to the respective types of communication interfaces. For example, if the tracking table indicates that 1500 mobile devices are present in ZIP code 98114, and that 1450 of those devices have an inactive 4G connection, the system may determine that a 4G outage exists in ZIP code 98114. The tracking table may be updated each time a call quality test is requested by a user of a mobile device as described herein. In some embodiments, the tracking table may be updated at periodic intervals regardless of any user requests to test call quality and regardless of a lack of any such requests.

At block 340, if the system has determined that a service outage exists with respect to a first communication interface in the geographical area in which the mobile device is located, then the system proceeds to block 345. At block 345, the system transmits to the mobile device a notification of the service outage, including a recommendation that the mobile device be switched from the first communication interface (which is experiencing an outage) to a second communication interface. In addition to displaying the received notification and recommendation on a display of the mobile device, the system may display an option for a user of the mobile device to execute the suggested action by selecting the displayed option. Moreover, the system may be configured to automatically execute the suggested action without any input from a user of the mobile device. In one embodiment, the transmitted notification and recommendation are displayed on a screen of the mobile device within a software application installed on the mobile device. In another embodiment, the transmitted notification and recommendation may be received on the mobile device via a push notification, and may be displayed on a screen of the mobile device regardless of what software applications are installed or active on the mobile device.

At block 340, if the system has determined that a service outage does not exist in the geographical area in which the mobile device is located, then the system proceeds to block 350 to determine a quality score or metric based on the audio obtained from the telephone call at block 325. In some embodiments, the system calculates a Mean Opinion Score (MOS) using a Perceptual Objective Listening Quality Analysis (POLQA) algorithm as defined in International Telecommunication Union (ITU) Recommendation P.863, which is herein incorporated by reference in its entirety. The MOS may be expressed in terms of a scale ranging from 1 to 5, with 1 corresponding to poor quality and 5 corresponding to high quality. In other embodiments, the system may calculate various other types of quality scores using any number of different algorithms, including for example Perceptual Evaluation of Speech Quality (PESQ). In other embodiments, the system may calculate various other types of quality scores based on information contained in one or more CDRs. Additionally or alternatively, the system may consider factors such as delay, latency, interference, packet loss, and signal noise to calculate or adjust a calculated quality score or metric. A quality score may be expressed as a raw number, a percentage, as a visual or textual graphic, or as any combination thereof. For example, the system may display an icon with lighter coloring or shading to represent a weaker quality score or metric and darker lighting or shading to represent a higher quality score or metric. As yet another example, the system may display text such as "1—Poor," "3—Medium," or "5—High" to represent a calculated quality score or metric.

After calculating the quality score or metric, the system proceeds to block 355 to update the tracking table of Customer Care Database 130 for subsequent use in determining service outages impacting certain geographical areas as discussed herein with respect to block 330. At block 360, if the calculated quality score or metric falls below a threshold (thereby indicating an outage condition), the system proceeds to block 345 to suggest that the mobile device user switch from a first communication interface to a second communication interface. At block 360, if the calculated quality score or metric does not fall below a threshold (thereby indicating no outage condition), the system proceeds to block 365 to notify the user of the results of the quality score without recommending a change in communication interface.

REMARKS

The Figures and above description provide a brief, general description of a suitable environment in which the invention can be implemented. Although not required, aspects of the invention may be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

What is claimed is:

1. A computer-implemented method in a telecommunications network, the method comprising:
    receiving, by a network server, a request from a user equipment having multiple communication interfaces to test call quality of a first wireless communication interface of the user equipment
        wherein the user equipment is one of a plurality of user equipment located in a geographical area;
    obtaining, by the network server in response to the request, an audio sample from the user equipment via the first wireless communication interface;
    determining, by the network server, a quality metric of the first wireless communication interface in part based on the received audio sample;
    tracking quality metrics associated with remaining of the plurality of user equipment located in the geographical area; and
    in response to determining that a service interruption exists in the geographical area based on the quality metric of the first wireless communication interface and the quality metrics associated with the remaining of the plurality of user equipment located in the geographical area, transmitting a message to the user equipment,
        wherein the message comprises at least one recommendation that the user equipment be switched from the first wireless communication interface to a second wireless communication interface in the multiple wireless communication interfaces on the user equipment, and
        wherein the second wireless communication interface is different from the first wireless communication interface.

2. The method of claim 1, wherein obtaining of the audio sample comprises receiving a telephone call from the user equipment, wherein the telephone call is placed to a cell recipient selected by a user of the user equipment.

3. The method of claim 2, wherein the audio sample includes real-time audio from the telephone call.

4. The method of claim 1, wherein obtaining the audio sample comprises receiving a telephone call from the user equipment, and wherein the telephone call is placed to a predetermined call recipient selected by a telecommunication service provider or an original equipment manufacturer (OEM) associated with the user equipment.

5. The method of claim 4, wherein the audio sample includes prerecorded audio that is played during the telephone call.

6. The method of claim 1, wherein the quality metric is a Mean Opinion Score (MOS) and further wherein the MOS is generated by a Perceptual Objective Listening Quality Analysis (POLQA) algorithm.

7. The method of claim 1, wherein the recommendation is displayed at an interface of the user equipment after the message is transmitted to a client program installed on the user equipment or is transmitted to the user equipment via a push server using a push token.

8. A system configured for improving call quality at a user equipment, the system comprising:
    at least one processor;

at least one memory storing instructions, when executed by the at least one processor, performs a method that includes:

receiving, from a user equipment having multiple communication interfaces, a request to test call quality of a first wireless communication interface of the user equipment,
wherein the user equipment is one of a plurality of user equipment located in a geographical area;

obtaining an audio sample from the user equipment via the first wireless communication interface;

determining a quality metric of the first wireless communication interface in part based on the received audio sample;

tracking quality metrics associated with remaining of the plurality of user equipment located in the geographical area; and in response to determining that a service interruption exists in the geographical area based on the quality metric of the first wireless communication interface and the quality metrics associated with the remaining of the plurality of user equipment located in the geographical area, transmitting a notification to the user equipment,
wherein the notification to the user equipment,
wherein the notification includes at least one recommendation that the user equipment be switched from the first wireless communication interface to a second communication interface in the multiple communication interfaces on the user equipment, wherein the second communication interface is different from the first wireless communication interface.

9. The system of claim 8, wherein obtaining of the audio sample comprises initiating a telephone call from the user equipment, wherein the telephone call is placed to a cell recipient selected by a user of the user equipment.

10. The system of claim 9, wherein the audio sample includes real-time audio from the telephone call.

11. The system of claim 8, wherein obtaining the audio sample comprises initiating a telephone call from the user equipment, and wherein the telephone call is placed to a predetermined call recipient selected by a telecommunication service provider or an original equipment manufacturer (OEM) associated with the user equipment.

12. The system of claim 11, wherein the audio sample includes prerecorded audio that is played during the telephone call.

13. The system of claim 8, wherein the quality metric is a Mean Opinion Score (MOS) and further wherein the MOS is generated by a Perceptual Objective Listening Quality Analysis (POLQA) algorithm.

14. The system of claim 8, wherein the notification is displayed on an interface of the user equipment after the notification is transmitted to a client program installed on the user equipment or is transmitted to the user equipment via a push server using a push token.

15. A computer-implemented method in a telecommunications network for improving call quality at a mobile device, the method comprising:

transmitting, by a mobile device having multiple communication interfaces, a request to a network server to test call quality of a first wireless communication interface of the mobile device,
wherein the mobile device is one of a plurality of mobile devices located in a geographical area;

providing an audio sample from the mobile device to the network server via the first wireless communication interface; and receiving a notification from the network server indicating that a service interruption exists in the geographical area based on the audio sample from the mobile device and one or more audio samples from other mobile devices in the plurality of mobile devices, wherein the notification includes at least one recommendation that the mobile device be switched from the first wireless communication interface to a second wireless communication interface in the multiple wireless communication interfaces on the mobile device,
wherein the second wireless communication interface is different from the first wireless communication interface.

16. The method of claim 15, wherein providing the audio sample comprises initiating a telephone call from the mobile device, wherein the telephone call is placed to a cell recipient selected by a user of the mobile device.

17. The method of claim 16, wherein the audio sample includes real-time audio from the telephone call.

18. The method of claim 15, wherein obtaining the audio sample comprises initiating a telephone call from the mobile device, and wherein the telephone call is placed to a predetermined call recipient selected by a telecommunication service provider or an original equipment manufacturer (OEM) associated with the mobile device.

19. The method of claim 18, wherein the audio sample includes prerecorded audio that is played during the telephone call.

20. The method of claim 15, further comprising:
displaying the notification at an interface of the mobile device via a client program installed on the mobile device.

* * * * *